United States Patent [19]

Gartman et al.

[11] 4,445,630

[45] May 1, 1984

[54] EMERGENCY RECOVERY SYSTEM

[76] Inventors: Rayburn L. Gartman, 9217 Scranton, Houston, Tex. 77075; Donald L. Gartman, 519 Eastlake, Houston, Tex. 77034; Kenneth T. Kimmons, 855 Regal, Houston, Tex. 77034

[21] Appl. No.: 352,375

[22] Filed: Feb. 25, 1982

[51] Int. Cl.³ ............................................... B67D 5/60
[52] U.S. Cl. ................................... 222/464; 137/587; 137/590
[58] Field of Search ...................... 222/464, 481.5, 482, 222/402.17, 402.19; 137/38, 43, 587, 590; 220/86 R, 5 R

[56] References Cited

U.S. PATENT DOCUMENTS

| 1,542,116 | 6/1925 | Welker. | |
|---|---|---|---|
| 1,608,224 | 11/1926 | Mauran. | |
| 2,186,924 | 1/1940 | Hooper et al. | |
| 2,673,010 | 3/1954 | Barrow | 220/5 R |
| 2,684,683 | 7/1954 | Brown | 137/43 |
| 3,088,680 | 5/1963 | Fulton et al. | |
| 3,180,345 | 4/1965 | Klank, Jr. | 137/43 |

Primary Examiner—Stanley H. Tollberg
Attorney, Agent, or Firm—Kenneth H. Johnson

[57] ABSTRACT

An emergency recovery system for fluid transporting tanks wherein a pair of valves are mounted through the tank wall, preferably along the upper surface and extending from each valve is a conduit, the two conduits extend along opposite internal surfaces of the tank, substantially at 180° from each other and terminating at a point along the surface, preferably about the widest point in the cross section of the tank, such that if the tank is capsized onto its side, which is most usually the capsized position, one of the conduits will be at the deepest point and can be used to remove the fluids from the tank through the valve associated with that conduit. The other conduit and valve may be used as a relief valve as the fluid is removed from the first valve.

5 Claims, 5 Drawing Figures

EMERGENCY RECOVERY SYSTEM

BACKGROUND OF THE INVENTION

1. Field of the Invention

The present invention relates to a system and method for the removal of fluids from tank transports in emergency situations.

2. Related Art

Presently in this country and throughout the world there are hundreds of thousands of fluid transport vehicles in use. These are currently exemplified by tank trailers and railroad tank cars. No uncommonly these transports are involved in accidents wherein they are capsized. In such situations, depending on the fluid being transported, a capsized tank can present a serious health and environmental hazzard. In addition to the immediate hazzard, the roadway or track is frequently out of service until the fluid is off loaded and the transport tank removed.

Often when the tank capsizes, it begins to leak in some manner and off loading is required to protect the population and the environment. However, even if the tank is intact and not leaking, it is unsafe or impossible to right it until the load is removed.

The prior method employed and taught is to bore a hole in the upward wall of the tank and to syphon the fluids out through the opening. Quite apparently the operation of boring into the fluids creates a hazzard. This is particularly true when the fluids are explosive materials which are gaseous under atmospheric pressure.

An adavantage of the present invention is that an in-place system is provided which is ready to use in the event of a capsized tank. It is a further advantage that a method is provided by which fluids may be safely removed as soon as a transfer tank is available. It is further advantage that the improvement can be applied to existing transport tanks without great expense or change in overall operation of the tank. Similarly it is an advantage that the system may be incorporated into new tanks without great expense or excessive modification of fabrication technique. These and other advantages will become apparent from the following descriptions.

SUMMARY OF THE INVENTION

The present invention is an emergency fluid removal system for transport tanks comprising in combination a fluid transport tank, a first valve mounted thereon and having a conduit extending therefrom, adjacent to a first interior surface of said tank and spaced away therefrom to a point along said surface and a second valve mounted thereon and having a conduit extending therefrom adjacent to a second interior surface of said tank opposite to said first surface and spaced away from said second surface to a point along said second surface. The conduits are in fluid communication with the interior of said tank and through said valve to the exterior of the tank.

Generally the transport tanks are tubular in shape, e.g., cylindrical and are employed in a horizontal position. In this configuration the valves are mounted on or along the upper surface of the tank and the conduits extend a point along the interior walls to the point of the widest horizontal axis through the tank. This is because the capsized tanks usually are laying on one side with the top of the tank generally on the horizontal axis. By placing the conduits at the widest diameter this is the lowest point in the capsized tank and allows most of the fluid in the tank to be syphoned off through the conduit adjacent to that surface. The other conduit and valve are used as a relief valve to facilitate the pumping from the lower conduit.

The cross section of the tanks need not be circular but may be ellipsoid. The system would, of course, be operable for any cross sectional configuration of the tank. Similarly, the tank itself may be spherical and the internal conduits would be placed in the tank corresponding to the long axis of the transport vehicle, i.e., on the internal surfaces adjacent to or above the wheels.

The open ends of the conduits are preferably at the widest horizontal axis perpendicular to the longest axis of the tank or the transport vehicle. When a transport vehicle and tank capsize it is usually about the long axis thus a normally vertical side of the tank comes to rest on the surface. Thus, if the conduit terminates at the widest point it will be at the lowest point when the tank is capsized, and removal of 90 to 95% of the contained fluids will be possible.

The valve can be of any type, such as ball valve or gate valve and the coupling means on the valve for connection to a pump or recovery tank can be of any type, such as threads, clamp, snap on, and the like. The two valves in the system may be separate or may be combined in a single unit with each valve independently operable.

Preferably the conduits are spaced away from the internal surface by means of brackets fixedly mounted inside the tank.

The valves would preferably be positioned along the upper surface of the tank when the tank is in its normal operating position, thus, if the tank capsizes, which is generally onto one side or the other the valves which are on the top side end up on a generally horizonal plane and are in position for use. This is the case in most situations, however, it is clear that should the tank rotate 180° the valves would not be accessible and a second set of valves and associated conduits may be located along the bottom of the tank for greater preparedness.

DETAILED DESCRIPTION OF THE INVENTION AND PREFERRED EMBODIMENTS

Figure 1:
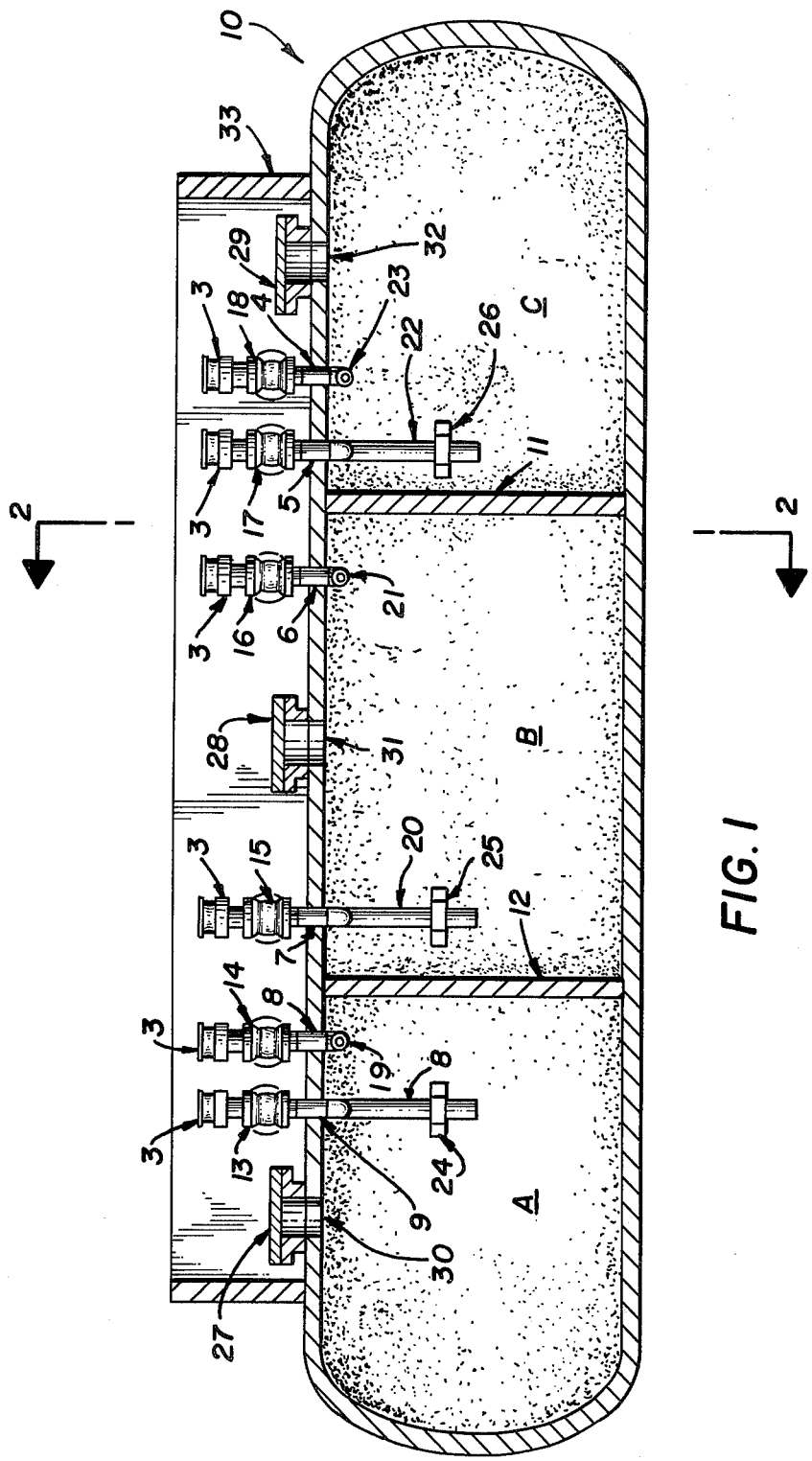
FIG. 1 is a cross sectional elevation of a tank with one embodiment of the emergency recovery system mounted therein.

Referring to FIG. 1, a tank 10 having an elongated horizontal configuration is shown in elevational cross section. The tank is divided into compartments A, B and C by walls 11 and 12. Openings 30, 13 and 32 are provided into compartments A, B and C, respectively, for loading and unloading fluids and for egress into the tank for cleaning and repair. Each of said openings 30, 31 and 32 being closed with covers 27, 28 and 29, respectively.

In compartment A, couplings 8 and 9 are mounted through the upper tank surface for example, by welding. Valve 13 is mounted to a coupling 9 and extends about the tank. Internal of the tank conduit 18 is attached to valve 13 and extends along the surface and is spaced away therefrom by bracket 24. Valve 14 is mounted to coupling 8 and a conduit 19 is attached thereto and extends down the opposite side of the tank. Both conduits 18 and 19 extend to approximately the widest point of the cross section of the tank.

Figure 2:
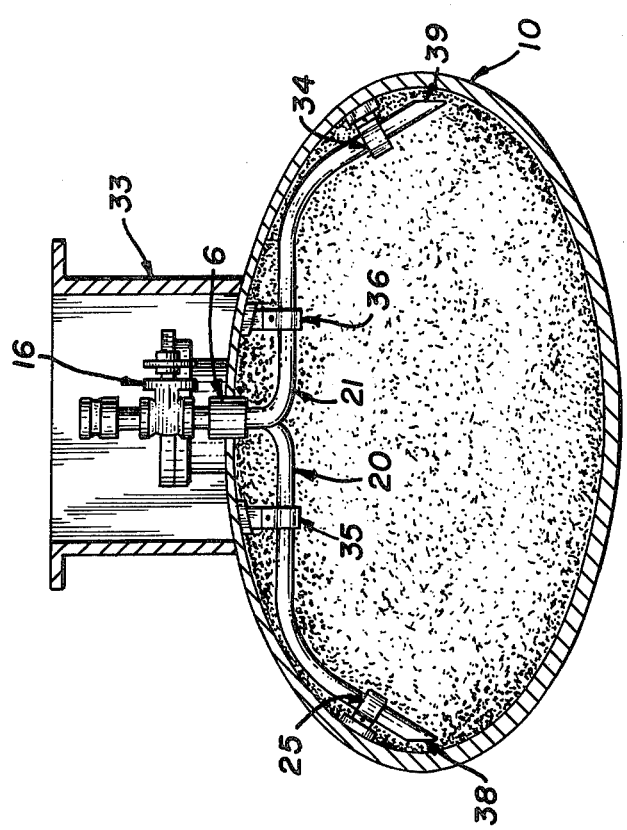
FIG. 2 is a view taken along section line 2—2 from FIG. 1.

In compartment B couplings 6 and 7 are welded in place through the tank wall on the upper surface. The conduit 20 is connected to couple 7 and spaced away from the internal surface of the tank by bracket 25. Valve 15 is attached to couple 7 external of the tank. Similarly, conduit 21 is attached to conduit 6 and valve 16 is mounted thereto external of the tank. Referring to FIG. 2, i.e., the view along line 2—2 of FIG. 1 the location of both conduits 20 and 21 and the mounting within the tank by brackets 25, 35 (conduit 20) and 34 and 36 (conduit 21) can be seen. The conduits extend in opposite directions from their respective valves at substantially 90° from the elongated axis of said tank. The tank 10 is generally ellipsoid is cross section and the terminal ends of conduits 20 and 21 are at the approximate widest diameter of the cross section of the tank. In this embodiment, the terminus 38 and 39 of conduits 20 and 21, respectively, are cut at a bevel to provide an opening closer to the wall, that is the opening in said conduits are directed toward said internal surface, which may be expected to be near the lowest point when the tank is capsized. The bevel cut is not required for the system to be operable but is desirable in order to be able to pump a greater amount of a liquid, for example from the tank. The brackets may be located at any point along the conduits, so long as they hold the conduits at the desired distance from the wall.

There are several considerations for this. First unsupported conduits might strike the tank and spark or puncture the tank. Secondly, if unsupported the conduits might become bent and not in proper position when needed. Thirdly, it can be expected that the tank wall may be crushed or bent if the tank is capsized, thus the bracket is intended to maintain the distance of the conduit from the wall and to prevent its puncturing the wall.

Compartment C has a similar arrangement to compartment A. Couplings 4 and 5 are mounted through the tank wall on the top with conduits 23 and 22 being attached thereto respectively. Valve 17 is attached to conduit 5 and valve 18 is attached to conduit 4.

A coupling means 3 is mounted to each valve to provide a point at which to connect a hose or other conduit to the valve for removing the fluids.

It can be seen that the conduits need not be directly opposite to each other although they may be, however their relative position is 180° apart.

Each conduit, couple, valve and coupling means are attached together to provide fluid communication therethrough (when the valve is opened) from the inside of the tank to the outside thereof.

Figure 5:
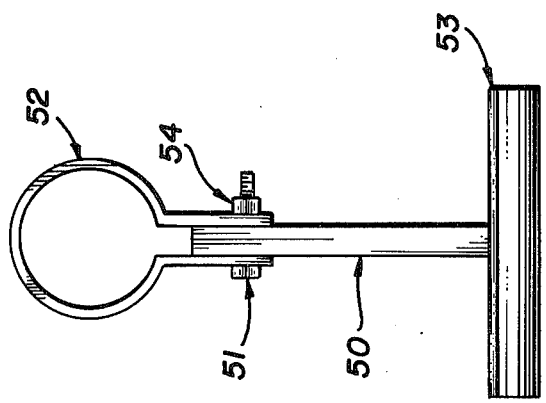
FIG. 5 is a 90 degree rotation of FIG. 4.
Figure 4:
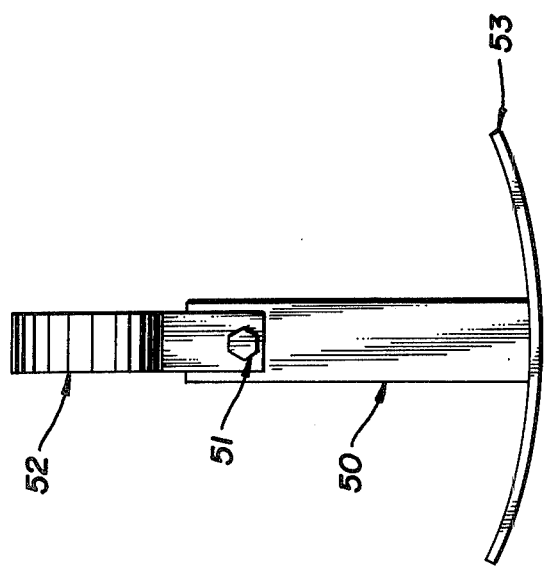
FIG. 4 is a detail view of a bracket used to space the conduits of the emergency recovery system away from the internal wall of the tank.

The brackets which hold the conduits in place are shown in detail in FIGS. 4 and 5. A pad 53 is provided to be welded to the tank wall thereby complying with regulations. A plate 50 is attached to the pad 53. A ring 52 is attached by nut 54 and bolt 51 to the plate 50, distal to the pad 53.

Figure 3:
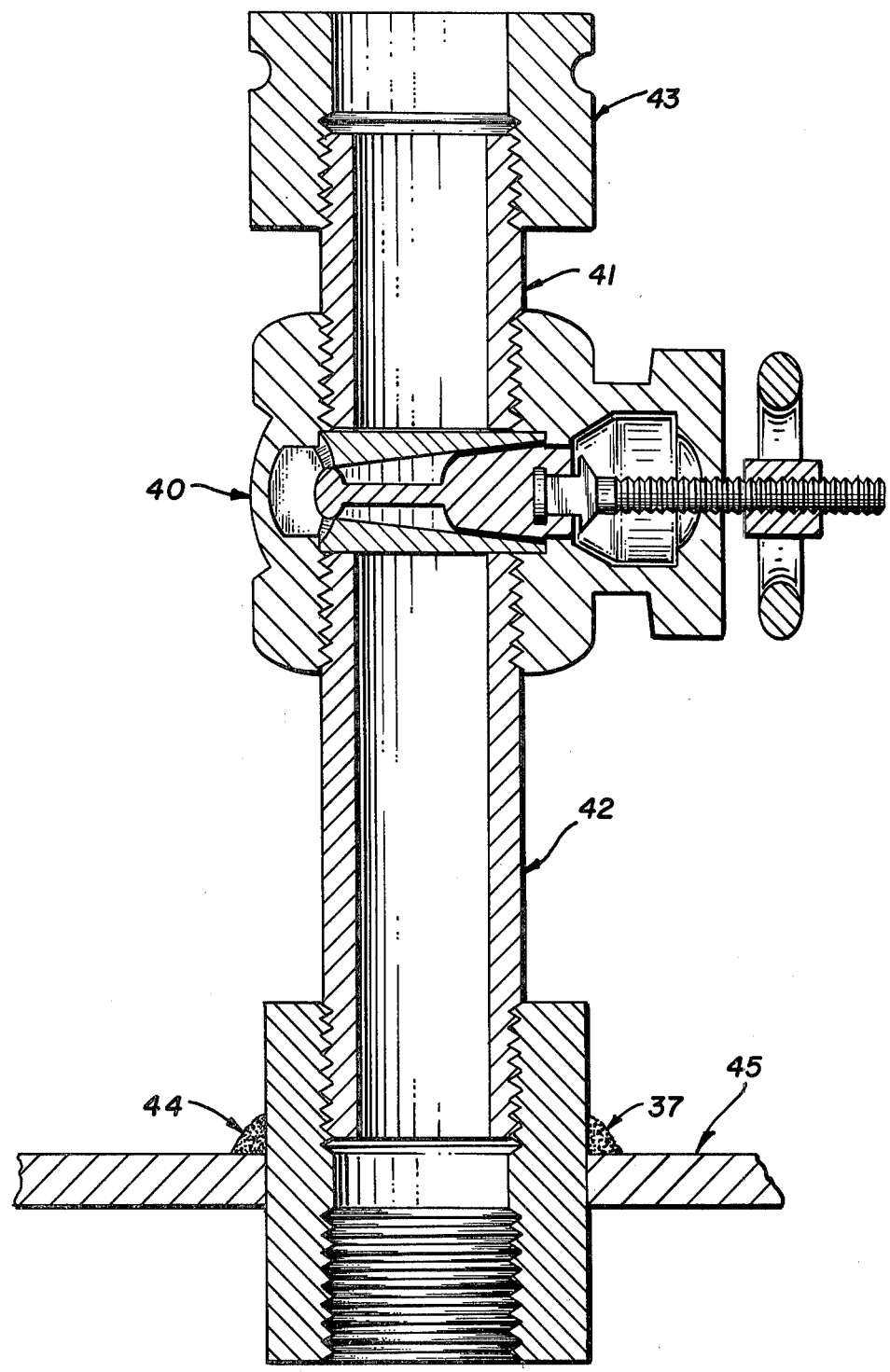
FIG. 3 is a cross sectional elevation of the valve.

The valve as noted above can be of any type. FIG. 3 shows a conventional gate valve 40 which is threadably engaged to pipe 42 which is threadably engaged into couple 37 which would be welded (bead 44) to tank 45. A second pipe 41 is threadably engaged to valve 40 and a quick coupling means 43 is threadably engaged thereon. It is clear that all of the connections, e.g., threads or welds must be fluid tight in order to maintain the integrity of the tank.

A specific transport vehicle is not depicted in the drawings, and it is expected the vehicle will be a trailer or rail car, however, other vehicles such as a sled could also have the tank mounted thereon.

The invention claimed is:

1. An emergency fluid removal system for transport tanks comprising in combination:
   a fluid transport tank having an elongated horizontal configuration in normal upright position, having an opening therein located on the upper surface in the normal upright position for loading and unloading fluids and cover means for closing said opening,
   a first valve mounted on said tank, having a conduit extending therefrom, adjacent to a first interior surface of said tank and spaced away therefrom to a point along said surface, and bracket means attached to said interior surface and to said conduit to hold said conduit in place,
   a second valve mounted on said tank, having a conduit extending therefrom adjacent to a second interior surface of said tank opposite to said first surface and bracket means attached to said interior surface and to said conduit to hold said conduit in place,
   each conduit and said valve attached thereto being in fluid communication with the interior of said tank, and
   said valves being located along the upper surface of said tank in said normal upright position and said conduits terminating at the sides at approximately the widest point of said tank cross section, whereby fluids in said tank may be removed through said valves and conduits when said tank is capsized on one side thereof and said upper surface in the normal position is generally on a horizontal axis through said tank such that fluids in said tank can be safely removed therefrom.

2. The system according to claim 1 wherein said tank is divided into compartments and each compartment contains a first and second valve and conduit associated therewith.

3. The system according to claim 1 wherein said tank has an ellipsoid cross section.

4. The system according to claim 3, wherein said conduits substantially are at 90° from the ongated axis of said tank.

5. The system according to claim 4 wherein the terminal ends of said conduits are bevelled toward said internal surface whereby the open end of said conduits are directed toward said internal surface.

* * * * *